Oct. 29, 1935.                L. C. TREMPALLA                2,018,690
            METHOD OF AND APPARATUS FOR PROJECTING PICTURES
                          Filed May 9, 1933
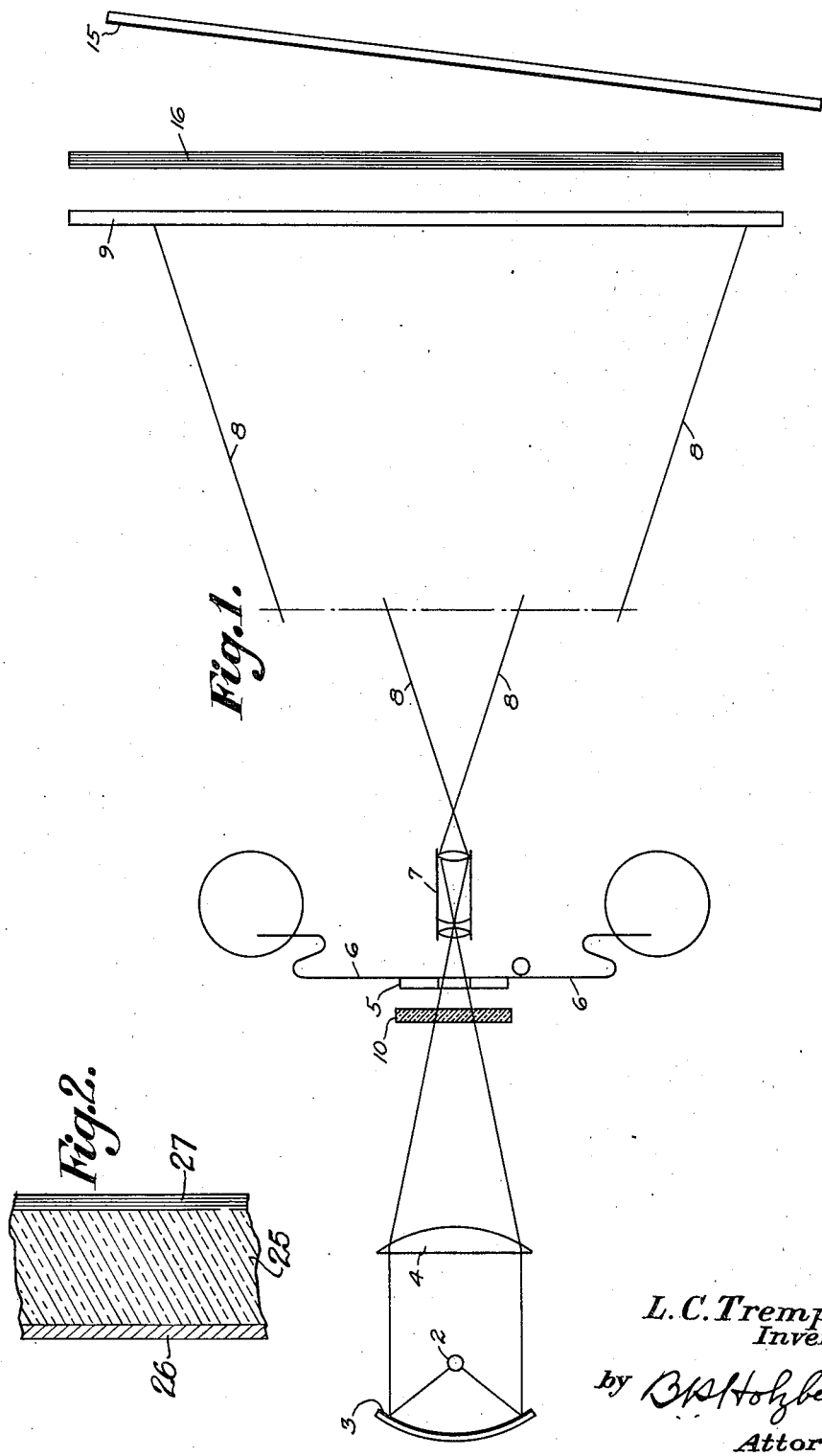
L. C. Trempalla
Inventor
by B. H. Holzberg
Attorney Patented Oct. 29, 1935

2,018,690

UNITED STATES PATENT OFFICE 2,018,690

METHOD OF AND APPARATUS FOR PROJECTING PICTURES

Leo C. Trempalla, La Salle, Ill.

Application May 9, 1933, Serial No. 670,163

16 Claims. (Cl. 88—16.4)

This invention relates to photographic projection of images upon a visual screen and has for its object to provide a method of projection as well as apparatus for carrying out the projection which will be more efficient in operation than those heretofore proposed.

With these and other objections in view the invention resides in the novel details of construction and combination of parts constituting the apparatus as well as in the novel steps and combinations of steps constituting the method, all as will be disclosed more fully hereinafter and particularly pointed out in the claims.

Referring to the accompanying drawing forming a part of this specification and in which like reference numerals indicate like parts in all the views,—

Fig. 1 represents diagrammatically an apparatus for carrying out this invention; and Fig. 2 is a vertical sectional view much enlarged showing a portion of a modified form of projection screen.

This invention differs from heretofore known methods of projecting photographic images in color upon a visual screen in that, according to this method, a single source of light is used in the projecting and exhibiting, a projection film is used either with or without a color screen, and a minimum of prime colors is utilized in order to create a coloration on the projected image simulating the actual colors in the original object being reproduced.

This invention contemplates broadly the formation of color in the projected picture by the utilization of two screens of colors which are complementary so that when unobstructed light beams are passed through both screens the color of the one screen will absorb or neutralize the color of the other screen, and there will result no color, or white. For example one screen may be colored blue-green and the other screen may be colored red-orange, or slight variations in shades of these complementary colors, the color produced by these screens varying in degrees of shades also in accordance with the variance in densities of the positive film in the projector. There is also contemplated the variance in proportions of absorption of color produced by the one screen by the color in the other screen, which likewise is controlled by the densities of the various portions of the projection film. The specific construction of an apparatus as well as the operation of this process, as more fully hereinafter particularly disclosed, is only exemplary, it being understood that this invention is generally applicable to all optical processes involving the projection of images, such as stereoptical projection, motion pictures, television, etc.

The invention can be particularly explained by reference to the accompanying diagram, constituting Fig. 1, in which there is indicated a projecting apparatus and a translucent projection screen for receiving the image from the positive film inserted in said apparatus. With such combination there is provided a source of light 2 of any desirable form having an intensifying reflector 3 therebehind for projecting the light through the condenser or concentrating lens 4 from which the light beams will pass through the aperture plate 5 associated with which is the ordinary or uncolored film 6 having thereon the usual black and white reproduction or image of the object, said light beams thereafter passing through the usual projection lens assembly indicated at 7 from which they issue divergently as indicated at 8 to ultimately reach the projection screen 9. In the diagram the film 6 is illustrated as a portion of a motion picture reel film, but it will be understood that it could be a single photographic positive film either in gelatine formation or of the plate variety.

The projection screen 9 is preferably made of glass, one surface of which is frosted or similarly treated in order to make the screen translucent, this screen being disposed in a plane substantially perpendicular to the axis of the cone of projected light beams. Preferably somewhere in the light beams between the source of light and the end of the projection lens assembly there is provided an element or member tinted with one of the complementary colors and therefore capable of giving to the projected light beam for example a light blue-green color so that the image as projected from the film upon the screen 9 would have this basic coloration, or in other words would ordinarily have this color predominate in all portions thereof, although it will be understood that the varying densities of the positive film will cause a deeper shading of this color in certain parts of the projected image, and lighter shadings in other parts, these differences in shading being in proportion to and similarly placed with respect to the corresponding variance in density in said film. In the diagram, such an element or member is indicated at 10 and shaded for the color blue-green, but said indication has material thickness only for the purpose of making possible the color shading, it being understood that this element 10 may be of any suitable material and thickness such as a thin film or a sheet of colored glass for examples.

On the side of the translucent screen 9 away from the projecting apparatus there is provided a second or reflecting screen 15 of any suitable construction and capable of reflecting back, to the rear surface of the projection screen 9, the light beams from the projecting apparatus which have passed through said translucent screen. Somewhere between the translucent screen and the reflecting screen there is provided an element or member generally indicated by the numeral 16, tinted with the other of the complementary colors and therefore capable of giving for example light red-orange color to those beams of light which have passed through the translucent screen and are reflected by the screen 15. In the diagram this member is shaded for the red-orange color, but is shown with material thickness only for the purpose of making possible the color shading, it being understood that this element or member 16 may be of any suitable material and thickness as stated with respect to the other coloring member 10. Also, these screens may have their complementary colors reversed so that the basic coloration of the projected image would be red-orange and the blue-green color modification would be caused by the reflector screen 15. Further, various changes may be made in the preparation of the translucent screen and in the location of the color members, a somewhat similar result being obtainable as indicated in Fig. 2 with a translucent screen 25 frosted on both sides, a light blue-green color in the form of a colloidal gelatine 26 being applied directly to the front or projection side of the screen, and a light red-orange color in the form of a similar colloidal gelatine 27 being applied to the other side. Also, the blue-green color member 10 and/or the red-orange color member 16 could be placed in substantially contact juxtaposition with the surfaces of the projection screen, taking the places of the colloidal gelatines 26 and/or 27 but, for most practical purposes, the blue-green member is preferred placed somewhere in the projection apparatus, so that it may be removed readily when projection without color effect is desired. In Fig. 2 the colloidal gelatines 26 and 27 have been given material thickness for the purpose of making possible the color shading, and the cross-hatching of the projection screen 25 has been done only for the purpose of indicating the sectional nature of this view. In some instances it may be found that the gelatines will be sufficient to render the screen translucent, and in such cases the frosting of the screen surface will be unnecessary. The reflecting screen 15 is illustrated as being inclined to the translucent screen 9; this angle may be varied as found best suited to govern the direction of the reflected rays.

Due to the fact that two screens are used in spaced relation to each other, one permitting the light rays to pass entirely therethrough with a certain amount of diffusion, and the other provided with a reflecting surface by which the beams of light are transmitted back to the other screen with corresponding diffusion in passing therethrough to the visual surface, each beam of light is given a slight additional width, resulting in halation which gives apparent depth, to an individual of the audience, of that particular part of the picture being projected. Also, by the use of the reflecting surface 15 as indicated, and placed at an incline to the translucent screen 9 to make a particular angle of reflection with the incident light beam, the reflected rays transmitted through the light or uncovered portions of the visual image on screen 9 can not be pronounced and objectionable.

By this invention it will therefore be understood that the light beams from the projecting apparatus will carry the image of the film 6 in degrees of denseness corresponding to the densities of said film, and that this image will be cast or projected upon the translucent screen 9 primarily in the color blue-green, but said light beams will pass through the translucent screen and be reflected by the other screen 15, and the reflected beams will have a red-orange coloration likewise in a variance of density in accordance with the density of the projected image. These reflected beams of the red-orange color will mix, blend, and harmonize with the blue-green color beams of the directly projected image and, because of the sameness of density in both colored formations, there will be produced apparently upon the surface of the translucent screen, to be viewed by the audience, a reproduction of the image of the film in pleasing color effect and wherein the coloration closely simulates the coloration of the original object.

It will, of course, be understood that the mixing or combination in equal proportions of the light blue-green color and the light red-orange color will produce white because of the absorption of the two colors, one by the other. Therefore, the particular shades of blue-green and of red-orange are selected so that equal portions of each will produce white. Hence, when a light beam colored blue-green is projected through the clear portion of the film 6, the corresponding clear area on the translucent screen 9 will have no color because of the absorption of the blue-green color in this area by the red-orange color of the reflected beams of said area. On the other hand, the more densely formed areas of the film will have the tendency to prevent, in varying degrees, the passage of light beams therethrough and therefore there will be an unbalancing of the blue-green and red-orange color portions resulting in a predominance of one or the other color, according to the particular density of the film. Since the densities in the film are automatically varied in practically accurate proportion to the variance in densities of color in the object being initially photographed, it will thus be realized that these same densities in the film will control the ratio of blue-green to red-orange in the projected image on the screen 9.

As a concrete example there was obtained a film of an American flag. When this was projected onto the screen 9, without the red-orange coloration therebehind, but with a blue-green gelatine placed in the beam of light from the projecting apparatus, it was observed both on the front and rear of the projection screen 9 that the white bars in the flag were very much lighter in shade and transparency than those representing the red bars. It was also clearly observed that the blue field was very much darker than the white bars and that it was several shades darker than the red bars, but that all had the light blue-green color shading in accordance with the proportions of transparency produced by the film. The reflector screen 15 was then placed in the rear of the translucent screen 9 and a sheet of red-orange colored gelatine was placed between the two screens in various positions. The reflector screen was then adjusted as to position with respect to the translucent screen, by tilting it away and toward the latter, until there was obtained an angle which caused the light blue-green rays penetrating the translucent screen to strike the reflector screen and be reflected thereby to produce a reflection of red-orange color on the translucent screen which blended and harmonized with the blue-green image of the flag to give the red, white and blue simulation of the original colors of the flag.

As various changes may be made in the character of the above embodiment and its adaptation to the art of projection of images the foregoing is to be interpreted as illustrative and not in a limiting sense.

What is claimed is:

1. The method of exhibiting to an audience an image of an object in color which consists in making for projection a positive image of the object upon a film; projecting the image upon a translucent screen whereby a part of the projected light rays will pass through said screen; causing the projected image to have a certain basic coloration; reflecting back upon said screen the light rays which passed therethrough; and causing the reflected light rays to have a coloration different from the basic coloration of the projected image.

2. The method of exhibiting to an audience an image of an object in color which consists in making for projection a positive image of the object upon a film, said positive produced from a negative panchromatic film; projecting the black and white image of the positive upon a translucent screen whereby a part of the projected light rays will pass through said screen; filtering the projected image to produce a basic coloration of blue-green varying in density in accordance with the densities of the black and white image on the film; reflecting back upon said screen the light rays which passed therethrough; and giving to the reflected light rays a coloration of red-orange.

3. The method of exhibiting to an audience an image of an object in color which consists in making for projection a positive image of the object upon a film, said positive produced from a negative panchromatic film; projecting the black and white image of the positive upon a translucent screen whereby a part of the projected light rays will pass through said screen; filtering the projected image to produce a basic coloration of blue-green varying in density in accordance with the densities of the black and white image on the film; reflecting back upon said screen the light rays which passed therethrough; and giving to the reflected light rays a coloration of red-orange likewise varying in density in accordance with the densities of the black and white image on the film.

4. The method of exhibiting to an audience an image of an object in color which consists in making for projection a positive image of the object upon a film; projecting the image upon one side of a translucent screen whereby a part of the projected light rays will pass through said screen; causing the projected image to have a basic coloration of blue-green; reflecting back onto the other side of said screen the light rays which passed therethrough; and causing the reflected light rays to have a coloration of red-orange.

5. The method of exhibiting to an audience an image of an object in color which consists in making for projection a positive image of the object upon a film; projecting the image upon a translucent screen whereby a part of the projected light rays will pass through said screen; causing the projected image to have a basic coloration; reflecting back upon said screen the light rays which passed therethrough; and causing the reflected light rays to have a coloration complementary to the basic coloration of the projected image.

6. The method of exhibiting to an audience an image of an object in color produced by using a combination of complementary colors in combination with uncolored light, the image being formed upon a film for projection; which consists in projecting the image upon a translucent screen whereby a part of the projected light rays will pass through said screen; causing the projected image to have a basic coloration of one of said complementary colors when viewed by the audience; reflecting back upon said screen the light rays which passed therethrough; and giving to the reflected light rays the other of said complementary colors.

7. The method of exhibiting to an audience an image of an object in color produced by using a combination of complementary colors in combination with uncolored light, the image being formed upon a film for projection, which consists in projecting the image upon a translucent screen through a transparent medium of one of said colors thereby giving the projected image a basic coloration of that color and permitting a part of the projected light rays to pass through said screen; reflecting back upon said screen the light rays which passed therethrough; and giving to the reflected light rays the other of said complementary colors.

8. The method of exhibiting to an audience an image of an object in color produced by using a combination of complementary colors in combination with uncolored light, the image being formed upon a film for projection, which consists in projecting the image upon one side of a translucent screen through a transparent medium of one of said colors thereby giving the projected image a basic coloration of that color and permitting a part of the projected light rays to pass through said screen; reflecting back onto the other side of said screen the light rays which passed therethrough; and giving to the reflected light rays the other of said complementary colors.

9. In an apparatus of the class described the combination of projecting means including a source of light; a translucent projection screen; a film disposed in said means and having thereon an image capable of being projected upon said screen by said light; means to color the projected image a certain color, said means disposed in the path of the projecting light beams to give a basic coloration of that color to the projected image on the screen; means to return image rays passed by the screen in substantial registry with the basic image; and means to color the returned rays a color complementary to the first mentioned color.

10. In an apparatus of the class described the combination of projecting means including a source of light; a translucent projection screen; a film disposed in said means and having thereon an image capable of being projected upon said screen by said light; means to color the projected image a certain color, said means disposed in front of said screen and in the path of the projecting light beams to give a basic coloration of that color to the projected image on the screen; means disposed to the rear of said screen to return image rays passed by the screen in substantial registry with the basic image; and means to color the returned rays a color complementary to the first mentioned color.

11. In an apparatus of the class described the combination of projecting means including a source of light; a translucent projection screen; a film disposed in said means and having thereon an image capable of being projected upon said screen by said light; means to color the projected image a certain color, said means disposed in the path of the projecting light beams to give a basic coloration of that color to the projected image on the screen; a reflecting surface facing said screen to return image rays passed by the screen in substantial registry with the basic image; and means to color the returned rays a color complementary to the first mentioned color.

12. In an apparatus of the class described the combination of projecting means including a source of light; a translucent projection screen; a film disposed in said means and having thereon an image capable of being projected upon said screen by said light; means to color the projected image a certain color, said means disposed in the path of the projecting light beams to give a basic coloration of that color to the projected image on the screen; a reflecting surface facing said screen to return image rays passed by the screen in substantial registry with the basic image; and means between said surface and said screen to color the returned rays a color complementary to the first mentioned color.

13. In an apparatus of the class described, the combination of projecting means including a source of light; a translucent projection screen; a film disposed in said means and having thereon an image capable of being projected upon said screen by said light; a transparent medium disposed in the path of the projecting light beams and tinted a certain color to give a basic coloration to the projected image on the screen; a mirror disposed back of said screen with its reflecting surface facing said screen and the projected light beams; and a second transparent medium tinted with a color complementary to the first named color and disposed between the reflecting surface of said mirror and said screen to modify the basic coloration by light from said source reflected by said mirror and passing therethrough.

14. In combination a translucent screen for receiving thereon an image projected by a source of light; means to give the projected image a basic coloration; means to return image rays passed by the screen; and means to give to the returned rays a color complementary to the basic coloration.

15. In combination a translucent screen for receiving thereon an image projected by a source of light; means including a transparent medium disposed and tinted to give the projected image a basic coloration; means to return image rays passed by the screen, and means including an independent transparent medium to give to the returned rays a color complementary to the basic coloration.

16. In combination a translucent screen for receiving thereon an image projected by a source of light; means disposed on one side of said screen to give the projected image a basic coloration; means to return image rays passed by the screen; and means disposed on the other side of said screen to give to the returned rays a color complementary to the basic coloration.

LEO C. TREMPALLA.